(12) United States Patent
Chiu et al.

(10) Patent No.: US 10,989,946 B2
(45) Date of Patent: Apr. 27, 2021

(54) ELECTRONIC MODULATING DEVICE

(71) Applicant: InnoLux Corporation, Miao-Li County (TW)

(72) Inventors: Liang-Yun Chiu, Miao-Li County (TW); Tsung-Han Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/281,325

(22) Filed: Feb. 21, 2019

(65) Prior Publication Data

US 2020/0271982 A1    Aug. 27, 2020

(51) Int. Cl.
  *G02F 1/1333*   (2006.01)
  *G02F 1/1343*   (2006.01)

(52) U.S. Cl.
  CPC .. *G02F 1/133345* (2013.01); *G02F 1/134309* (2013.01)

(58) Field of Classification Search
  CPC .............. G02F 1/133345; G02F 1/134309
  See application file for complete search history.

(56) References Cited

U.S. PATENT DOCUMENTS

| 7,940,345 B2* | 5/2011 | Yamazaki | ............... H01L 27/12 349/43 |
| 2010/0227425 A1* | 9/2010 | Tanabe | ............. G02F 1/136227 438/30 |
| 2016/0172473 A1* | 6/2016 | Suzuki | ................ H01L 29/0843 257/43 |

* cited by examiner

*Primary Examiner* — Dung T Nguyen
(74) *Attorney, Agent, or Firm* — McClure, Qualey & Rodack, LLP

(57) ABSTRACT

An electronic modulating device is provided, which includes a first substrate, a second substrate disposed opposing to the first substrate, and a modulating material disposed between the first substrate and the second substrate. The electronic modulating device includes a buffer layer disposed on the first substrate, and a first electrode disposed on the buffer layer. The buffer layer includes a first opening defining a first top edge and a first bottom edge of the buffer layer. The first electrode includes a second opening defining a second top edge and a second bottom edge of the first electrode. The electronic modulating device includes an organic insulating layer disposed on the first electrode and within the first opening and the second opening. The thickness of the organic insulating layer at the second bottom edge is greater than the thickness of the organic insulating layer at the first top edge.

11 Claims, 12 Drawing Sheets

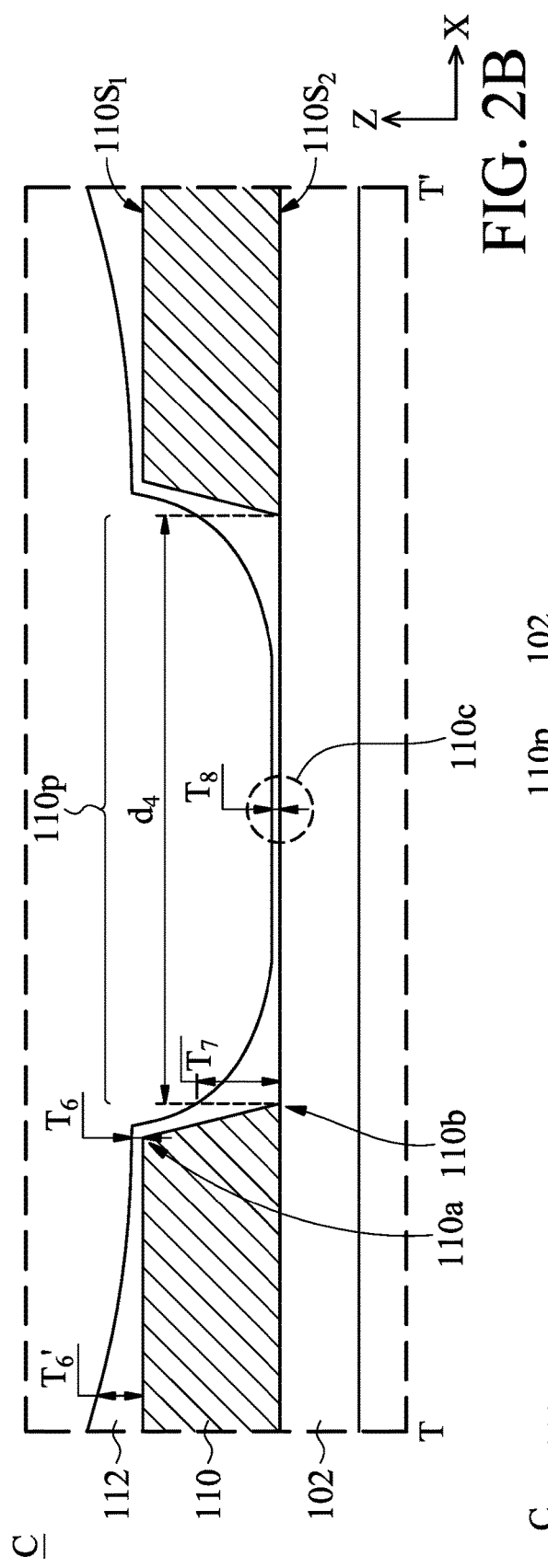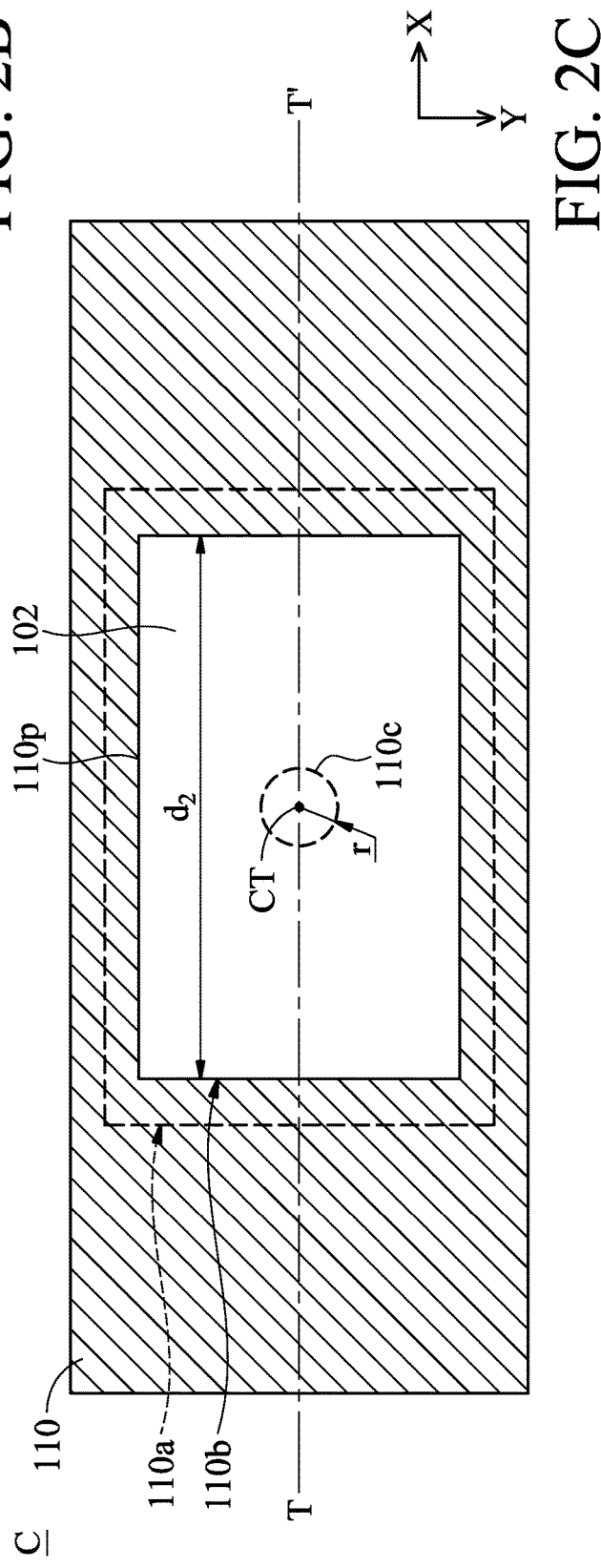

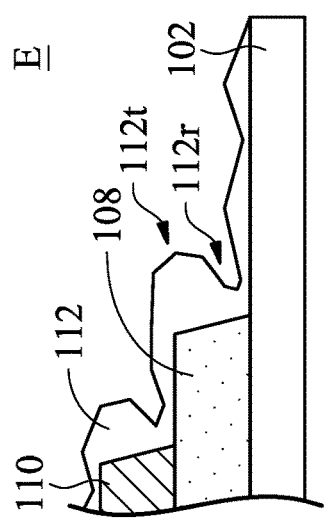
FIG. 4A
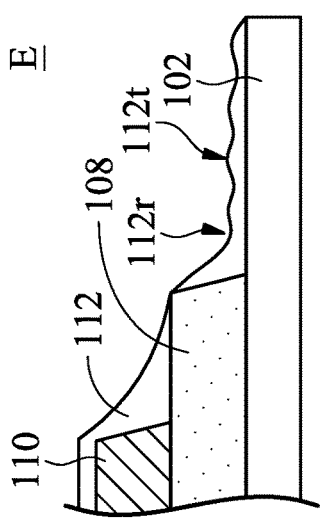
FIG. 4B
FIG. 4C
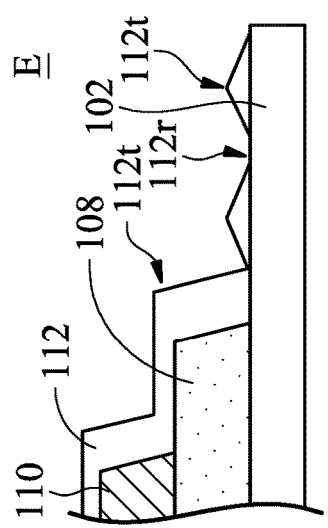
FIG. 4D
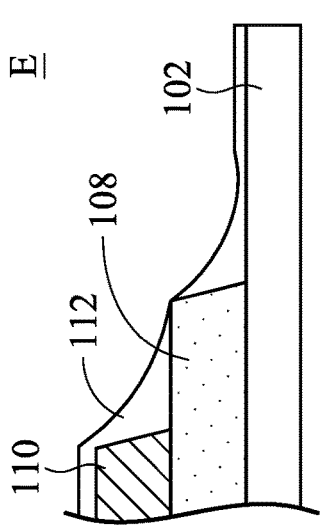
FIG. 4E
FIG. 4F
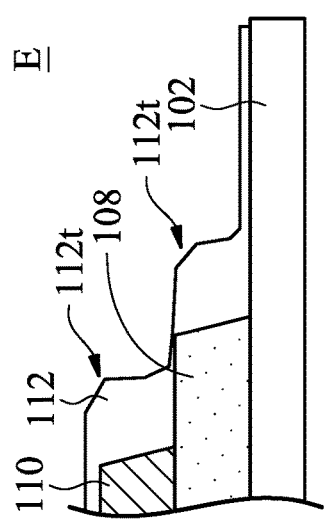
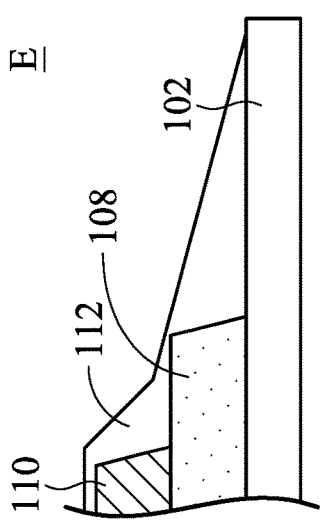
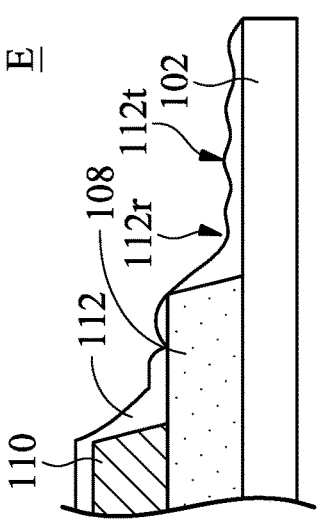
FIG. 4G

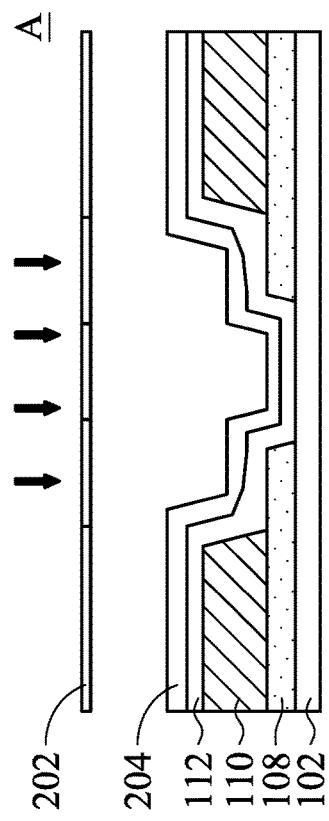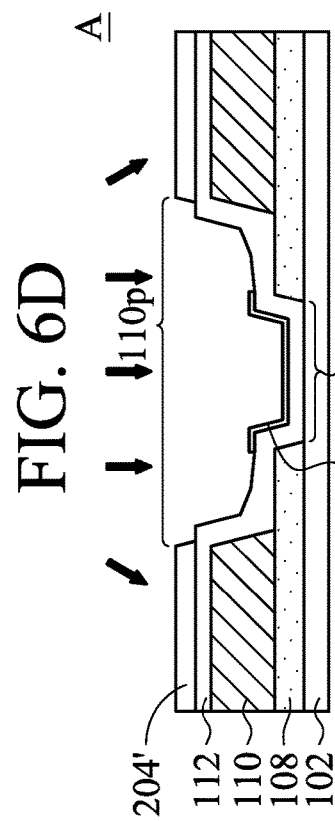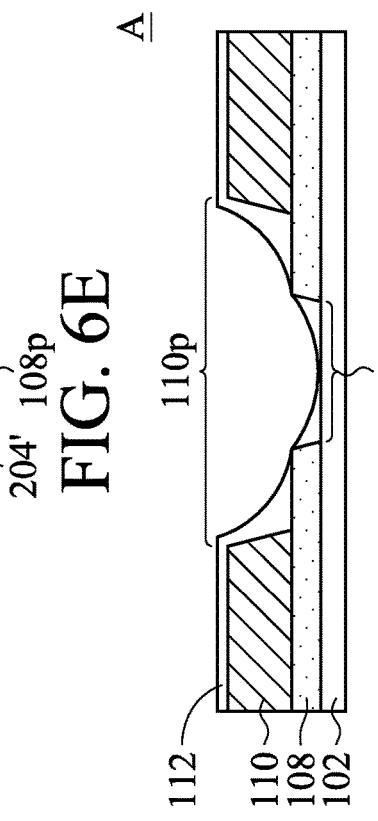

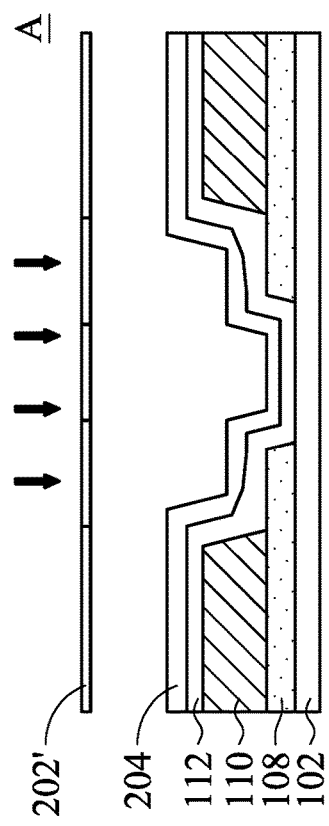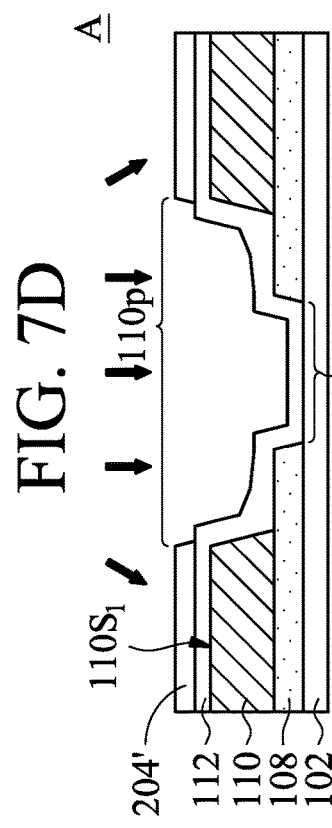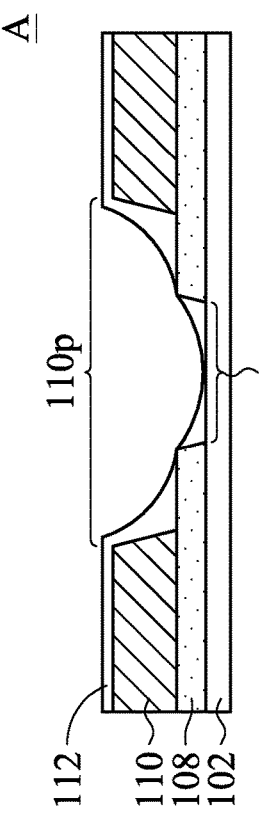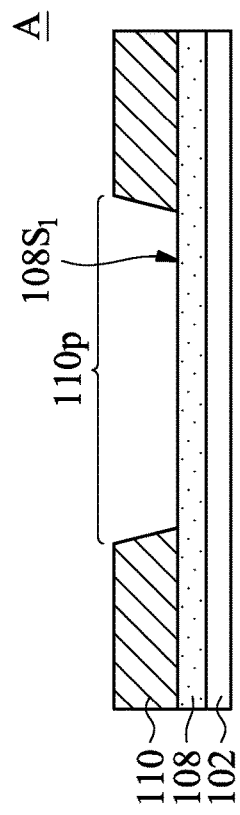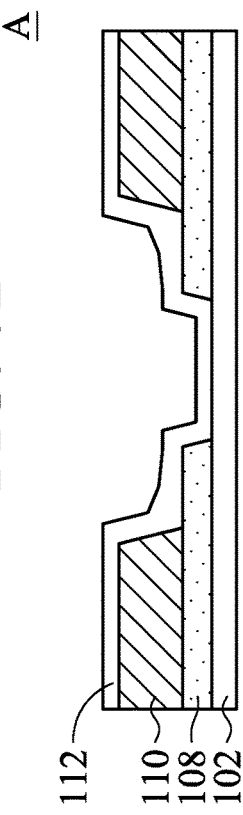

ELECTRONIC MODULATING DEVICE

BACKGROUND

Technical Field

The present disclosure relates to an electronic modulating device, and in particular it relates to an organic insulating layer of the electronic modulating device.

Description of the Related Art

Electronic products that include a display panel, such as smartphones, tablets, notebook computers, monitors, and TVs, have become indispensable necessities in modern society. With the flourishing development of such portable electronic products, consumers have high expectations regarding their quality, functionality, and price. Some of these electronic products are provided with communications capabilities that depend on modulating structures (e.g., antennas) to operate.

Although existing electronic modulating devices have been adequate for their intended purposes, they have not been entirely satisfactory in all respects. For example, the dielectric loss resulting from the insulator in the electronic modulating device is an issue. Therefore, at present, there remain problems that need be solved in the technology behind electronic devices.

SUMMARY

In accordance with some embodiments of the present disclosure, a modulating electronic device is provided. The modulating electronic device includes a first substrate, a second substrate disposed opposing to the first substrate and a modulating material disposed between the first substrate and the second substrate. The electronic modulating device also includes a buffer layer disposed on the first substrate, and a first electrode disposed on the buffer layer. The buffer layer includes a first opening defining a first top edge and a first bottom edge of the buffer layer. The first electrode includes a second opening defining a second top edge and a second bottom edge of the first electrode. The electronic modulating device also includes an organic insulating layer disposed on the first electrode and within the first opening and the second opening. The thickness of the organic insulating layer at the second bottom edge is greater than the thickness of the organic insulating layer at the first top edge.

In accordance with some other embodiments of the present disclosure, a modulating electronic device is provided. The modulating electronic device includes a first substrate, a second substrate disposed opposing to the first substrate and a modulating material disposed between the first substrate and the second substrate. The electronic modulating device also includes an electrode disposed on the first substrate, and the electrode comprising an opening defining a top edge and a bottom edge of the electrode. The opening has a central portion. The electronic modulating device also includes an organic insulating layer disposed on the electrode and within the opening. The thickness of the organic insulating layer at the bottom edge is greater than the thickness of the organic insulating layer at the central portion.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 2B is an enlarged diagram of region C in FIG. 2A in accordance with some embodiments of the present disclosure.

FIG. 2C is top-view diagram of region C in FIG. 2A in accordance with some embodiments of the present disclosure.

FIGS. 3A-3H are top-view diagrams of the opening of the first electrode in accordance with some embodiments of the present disclosure.

FIGS. 4A-4G are cross-sectional diagrams of a portion of the electronic modulating device in accordance with some embodiments of the present disclosure.

FIGS. 6A-6F are enlarged diagrams of region A in FIG. 1A during the manufacturing processes in accordance with some embodiments of the present disclosure.

FIGS. 7A-7F are enlarged diagrams of region A in FIG. 1A during the manufacturing processes in accordance with some embodiments of the present disclosure.

DETAILED DESCRIPTION

Figure 1A:
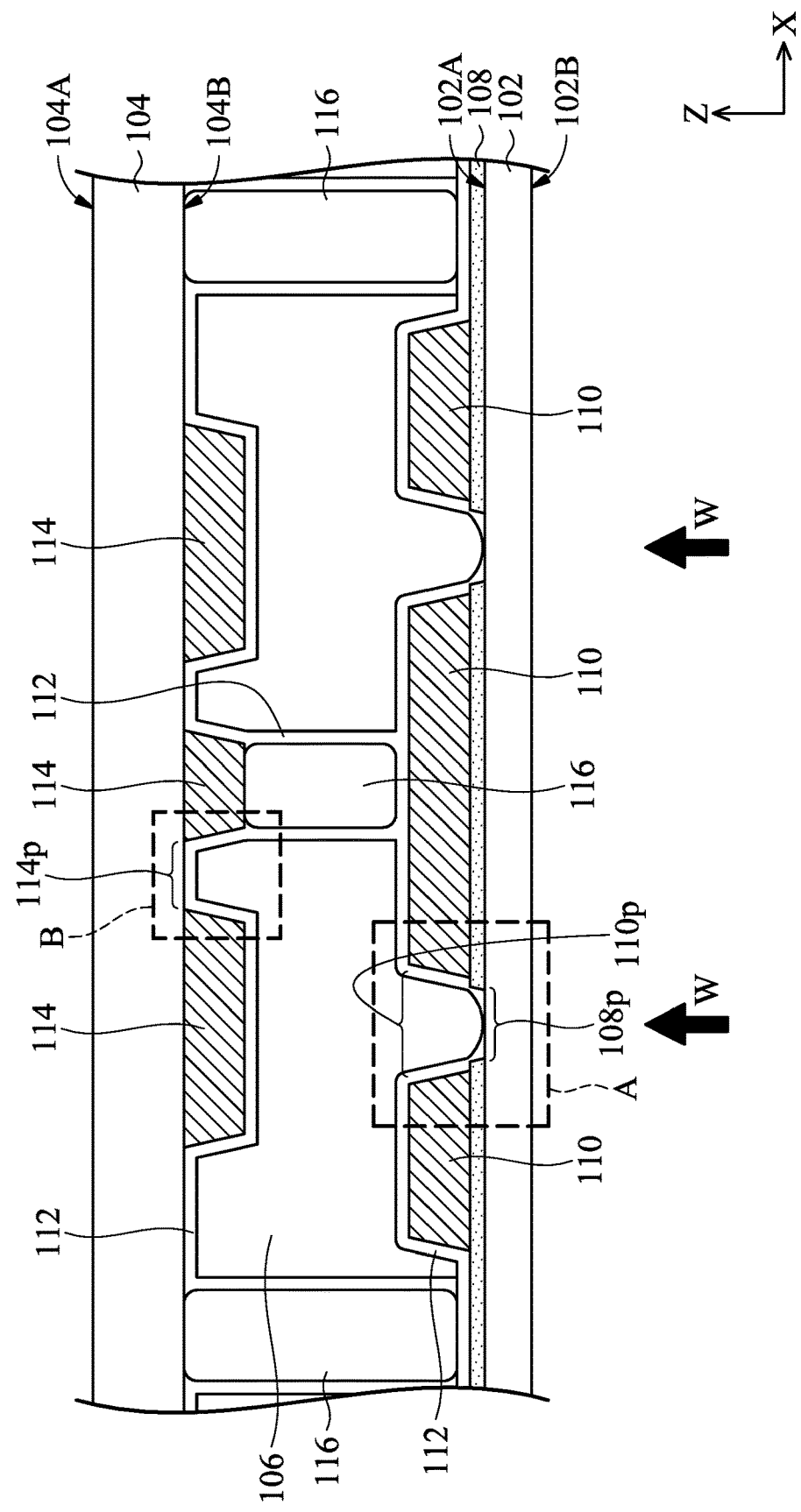
FIG. 1A is a cross-sectional diagram of an electronic modulating device in accordance with some embodiments of the present disclosure.

The electronic modulating device of the present disclosure and the method for manufacturing the electronic modulating device are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

It should be noted that the elements or devices in the drawings of the present disclosure may be present in any form or configuration known to those with ordinary skill in the art. In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The terms "about" and "substantially" typically mean +/−10% of the stated value, more typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In addition, the phrase "in a range between a first value and a second value" or "ranged from a first value to a second value" indicates that the range includes the first value, the second value, and other values between them.

In accordance with some embodiments of the present disclosure, an electronic modulating device is provided. The electronic modulating device may include an organic insulating layer having different thickness according to different positions. The thickness of the organic insulating layer may be controlled to decrease the dielectric loss of the electromagnetic wave or to decrease the amount of metal ions diffusing into the modulating material.

FIG. 1A is a cross-sectional diagram of an electronic modulating device 10 in accordance with some embodiments of the present disclosure. It should be understood that additional features may be added to the electronic modulating device 10 in accordance with some embodiments of the present disclosure. Some of the features of the electronic modulating device 10 described below may be replaced or omitted in accordance with some other embodiments of the present disclosure. In addition, it should be noted that only a portion of the electronic modulating device 10 (e.g., a portion of the working area) is illustrated in the figures, and the electronic modulating device 10 may include other structures (e.g., non-working area) depending on needs. In some embodiments, the electronic modulating device 10 may serve as an antenna, a smartphone, a tablet, a notebook computer, a monitor, a TV, and/or other applicable electronic modulating devices to receive and/or transmit the electromagnetic wave. In some examples, some components may be added or eliminated in some of the applications.

Referring to FIG. 1A, the electronic modulating device 10 may include a first substrate 102, a second substrate 104 and a modulating material 106. The second substrate 104 may be disposed opposing to the first substrate 102. The modulating material 106 may be disposed between the first substrate 102 and the second substrate 104. Specifically, the modulating material 106 may at least partially fill the space between the first substrate 102 and the second substrate 104. In some examples, the space may be formed by at least one sealant (not illustrated) disposed between the first substrate 102 and the second substrate 104. The modulating material 106 may be the material that can be adjusted to possess different properties (e.g., dielectric coefficients) by applying an electric field or another method. In some embodiments, the modulating material 106 may be used to control the transmission of the electromagnetic wave W (as indicated by an arrow), but it is not limited thereto.

In some embodiments, the material of the first substrate 102 and the second substrate 104 may include, but is not limited to, glass, quartz, sapphire, polycarbonate (PC), polyimide (PI), polyethylene terephthalate (PET), rubber, glass fiber, ceramic, another suitable material, or a combination thereof. In some embodiments, the first substrate 102 and the second substrate 104 may be a flexible substrate, a rigid substrate, or a combination thereof. In some embodiments, the material of the first substrate 102 may be the same as or different from that of the second substrate 104. In some embodiments, the modulating material 106 may include liquid-crystal molecules, but it is not limited thereto.

Figure 1B:
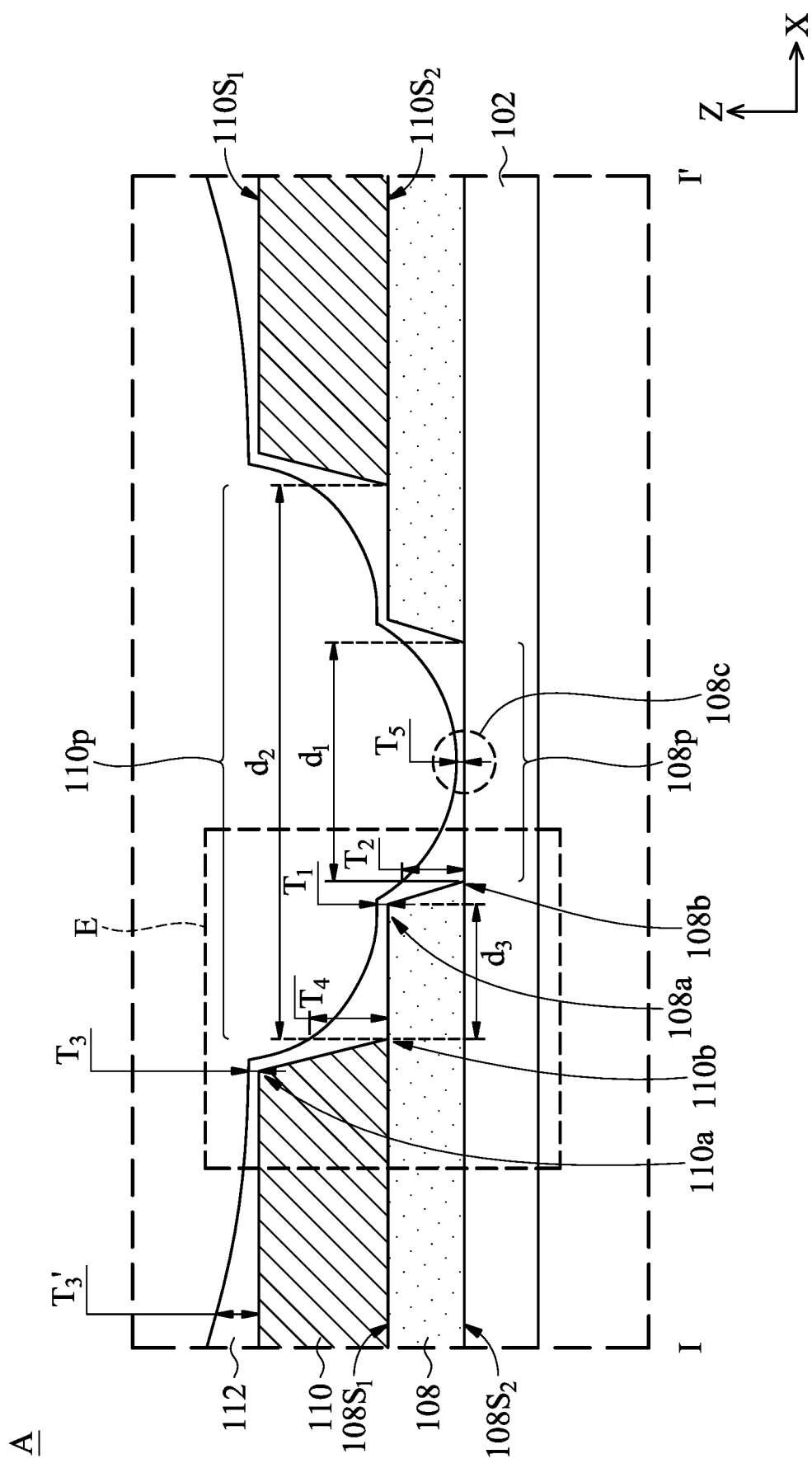
FIG. 1B is an enlarged diagram of region A in FIG. 1A in accordance with some embodiments of the present disclosure.

In addition, the electronic modulating device 10 may include a buffer layer 108 disposed on the first substrate 102. The buffer layer 108 may be disposed between the first substrate 102 and a first electrode 110. In some embodiments, the expansion coefficients of the first substrate 102 and the first electrode 110 may be substantially matched through the intermediate buffer layer 108 to reduce the warpage of the first substrate 102. In some embodiments, the buffer layer 108 may include a first opening 108$p$. The first opening 108$p$ may define a first top edge 108$a$ and a first bottom edge 108$b$ of the buffer layer 108 (as shown in FIG. 1B). The buffer layer 108 may include a top surface 108$S_1$ and a bottom surface 108$S_2$. Specifically, the first top edge 108a may refer to the highest point of the edge of the top surface 108S$_1$ of the buffer layer 108 in a cross-sectional view.

In some embodiments, the material of the buffer layer 108 may include, but is not limited to, an organic insulating material, an inorganic insulating material, a metal material, another suitable material, or a combination thereof. The organic insulating material may include, but is not limited to, an acrylic or methacrylic organic compound, an isoprene compound, phenol-formaldehyde resin, benzocyclobutene (BCB), perfluorocyclobutane (PECB), polyimide, polyethylene terephthalate (PET), or a combination thereof. The inorganic insulating material may include, but is not limited to, silicon nitride, silicon oxide, or silicon oxynitride or a combination thereof. The metal material may include, but is not limited to, titanium, molybdenum, tungsten, nickel, aluminum, gold, chromium, platinum, silver, copper, titanium alloys, molybdenum alloys, tungsten alloys, nickel alloys, aluminum alloys, gold alloys, chromium alloys, platinum alloys, silver alloys, copper alloys, another suitable material, or a combination thereof.

Referring to FIG. 1A, the electronic modulating device 10 may include the first electrode 110 disposed on the buffer layer 108. The first electrode 110 may be disposed between the first substrate 102 and the second substrate 104. The first electrode 110 may include a second opening 110p. The second opening 110p may define a second top edge 110a and a second bottom edge 110b of the first electrode 110 (as shown in FIG. 1B). The first electrode 110 may include a top surface 110S$_1$ and a bottom surface 110S$_2$. Specifically, the second top edge 110a may refer to the highest point of the edge of the top surface 110S$_1$ of the first electrode 110 in a cross-sectional view. In some embodiments, compared with the first top edge 108a of the buffer layer 108, the second bottom edge 110b of the first electrode 110 may be disposed away from the first opening 108p.

In some embodiments, the first electrode 110 may include a conductive material. In some embodiments, the material of the first electrode 110 may include, but is not limited to, gold, copper, silver, tin, aluminum, molybdenum, tungsten, chromium, nickel, platinum, gold alloy, copper alloy, silver alloy, tin alloy, aluminum alloy, molybdenum alloy, tungsten alloy, chromium alloy, nickel alloy, platinum alloy, another suitable conductive material or a combination thereof. Moreover, in some embodiments, the material of the first electrode 110 may be different from the material of the buffer layer 108.

In addition, the electronic modulating device 10 may include an organic insulating layer 112 disposed on the first electrode 110 and within the first opening 108p and the second opening 110p. The organic insulating layer 112 may be disposed between the first electrode 110 and the modulating material 106. In some embodiments, the organic insulating layer 112 may cover and be in contact with the buffer layer 108 and the first electrode 110. In some embodiments, the organic insulating layer 112 may be an alignment layer for the modulating material 106.

In particular, the organic insulating layer 112 may have different thickness within the first opening 108p and the second opening 110p to decrease the dielectric loss of the electromagnetic wave or diffusion of the metal ions into the modulating material. The configuration of the organic insulating layer 112, and the buffer layer 108 and the first electrode 110 will be described in detail in FIG. 1B.

In some embodiments, the material of the organic insulating layer 112 may include, but is not limited to, a polymer (e.g., polyimide, PI), a phenone-based insulating material, another suitable organic insulating material, or a combination thereof. For example, the phenone-based insulating material may include benzophenone, benzophenone, tetracarboxylic dianhydride (BTDA), or phenol formaldehyde resins (PF), but it is not limited thereto. In addition, in some other embodiments, an inorganic insulating layer may be used to replace the organic insulating layer 112.

Furthermore, the electronic modulating device 10 may further include a second electrode 114 disposed between the modulating material 106 and the second substrate 104. In some embodiments, the second electrode 114 may overlap the first opening 108p and the second opening 110p. As shown in FIG. 1A, the second electrode 114 may include an opening 114p in accordance with some embodiments.

Moreover, the organic insulating layer 112 also may be disposed on the second electrode 114. In some embodiments, the buffer layer 108 may also be disposed between the second electrode 114 and the second substrate 104. In addition, region B as illustrated in the figures may have similar a configuration (e.g., the thickness of the organic insulating layer 112) as region A in accordance with some embodiments.

In addition, the first electrode 110 and/or the second electrode 114 may be electrically connected to a functional circuit (not illustrated) respectively. The functional circuit may include an active element (e.g., a thin-film transistor (TFT) and/or a chip) or a passive element. In some embodiments, the functional circuit may be disposed on a surface 104B of the second substrate 104, where the second electrode 114 is disposed. In some other embodiments, the functional circuit may be disposed on a surface 104A of the second substrate 104 that is opposite to the surface 104B, and the second electrode 114 may be electrically connected to the functional circuit. In some examples, the second electrode 114 may be electrically connected to the functional circuit through a via hole (not illustrated) that penetrates through the second substrate 104. For example, the active driving element may include a thin-film transistor (TFT). In some embodiments, the active element may be integrated with the circuit of a gate on array (GOP) structure. The passive element may be controlled by an IC or a microchip disposed in or outside the electronic modulating device 10.

As described above, the second electrode 114 may include an opening 114p in accordance with some embodiments. More specifically, the second electrode 114 may be a patterned electrode with several portions in accordance with some embodiments. In some embodiments, the several portions of the second electrode 114 may be connected to different circuits.

In accordance with some embodiments, the electronic modulating device 10 may further include supporting elements 116 disposed between the first substrate 102 and the second substrate 104. In some embodiments, the supporting element 116 may be disposed between the first electrode 110 and the second electrode 114. The supporting element 116 may provide structural stability for the electronic modulating device 10. In some examples, the supporting element 116 may be formed on the first substrate 102 or the second substrate 104, but it is not limited thereto. The organic insulating layer 112 may be formed on the supporting element 116, the first substrate 102, and/or the second substrate 104.

In some embodiments, the material of the supporting element 116 may include, but is not limited to, dielectric material, metal material, organic material, or a combination thereof. In some embodiments, the dielectric material may include, but is not limited to, silicon oxide, silicon nitride, silicon oxynitride, another high-k dielectric material, or a combination thereof. In some embodiments, the metal material may include, but is not limited to, copper, silver, gold, copper alloy, silver alloy, gold alloy, another suitable metal material, or a combination thereof. In some embodiments, the organic material may include, but is not limited to, polyimide (PI), epoxy resin, acrylic resin (e.g., polymethylmetacrylate (PMMA)), benzocyclobutene (BCB), polyester, polydimethylsiloxane (PDMS), polytetrafluoroethylene (PFA) or a combination thereof.

In addition, in some embodiments, the supporting element 116 may include, but is not limited to, a sealant, a photo spacer, a liquid crystal polymer (LCP) layer, or a combination thereof. In some embodiments, the supporting element 116 may include a photo-curing or thermal curing sealant. For example, the supporting element 116 may include a photo-curing sealant (UV light or visible light), a thermal curing sealant, or a photothermal curing sealant.

Next, refer to FIG. 1B, which is an enlarged diagram of region A in FIG. 1A in accordance with some embodiments of the present disclosure. As described above, the organic insulating layer 112 may have different thickness within the first opening 108p and the second opening 110p. It should be noted that the thickness of the organic insulating layer 112 described herein refers to the thickness that is measured in the normal direction of the first substrate 102 (e.g., the Z direction shown in FIG. 1B). More specifically, in some examples, a cross-sectional image of the organic insulating layer 112 may be obtained by using scanning electron microscope (SEM), and then the thickness of the organic insulating layer 112 may be measured based on the cross-sectional image.

The organic insulating layer 112 may have a first thickness $T_1$ at the first top edge 108a of the buffer layer 108. The organic insulating layer 112 may have a second thickness $T_2$ at the first bottom edge 108b of the buffer layer 108. In addition, the organic insulating layer 112 may have a third thickness $T_3$ at the second top edge 110a of the first electrode 110. The organic insulating layer 112 may have a fourth thickness $T_4$ at the second bottom edge 110b of the first electrode 110.

In some embodiments, the fourth thickness $T_4$ of the organic insulating layer 112 at the second bottom edge 110b may be greater than the first thickness $T_1$ of the organic insulating layer 112 at the first top edge 108a. In some embodiments, the ratio of the first thickness $T_1$ of the organic insulating layer 112 to the fourth thickness $T_4$ of the organic insulating layer 112 may be greater than zero and less than or equal to 0.4, such as 0.35, 0.30, 0.25 or 0.2. The organic insulating layer 112 having a thinner thickness (e.g., the first thickness $T_1$) at the first top edge 108a may not affect the performance of electromagnetic wave since the dielectric loss resulting from the organic insulating layer 112 may be reduced. On the other hand, the organic insulating layer 112 having a thicker thickness (e.g., the fourth thickness $T_4$) at the second bottom edge 110b may decrease the amount of the metal ions of the first electrode 110 diffusing into the modulating layer 106.

In some embodiments, the fourth thickness $T_4$ of the organic insulating layer 112 at the second bottom edge 110b may be greater than the third thickness $T_3$ of the organic insulating layer 112 at the second top edge 110a. In some embodiments, the ratio of the third thickness $T_3$ of the organic insulating layer 112 to the fourth thickness $T_4$ of the organic insulating layer 112 may be greater than zero and less than or equal to 0.4, such as 0.35, 0.30, 0.25 or 0.2.

Furthermore, in some embodiments, the thickness of the organic insulating layer 112 on the top surface $110S_1$ of the first electrode 110 may be uniform. In other embodiments, the organic insulating layer 112 may have a third thickness $T_3'$ on the top surface $110S_1$ other than the second top edge 110a. In some embodiments, the third thickness $T_3'$ may be greater than or less than the third thickness $T_3$ of the organic insulating layer 112 at the second top edge 110a.

The third thickness $T_3$ at the second top edge 110a may be thinner than the fourth thickness $T_4$ at the second bottom edge 110b or the third thickness $T_3'$ on the top surface $110S_1$, and thereby the intensity of the electric field consumed at the second top edge 110a may be reduced.

Figure 1C:
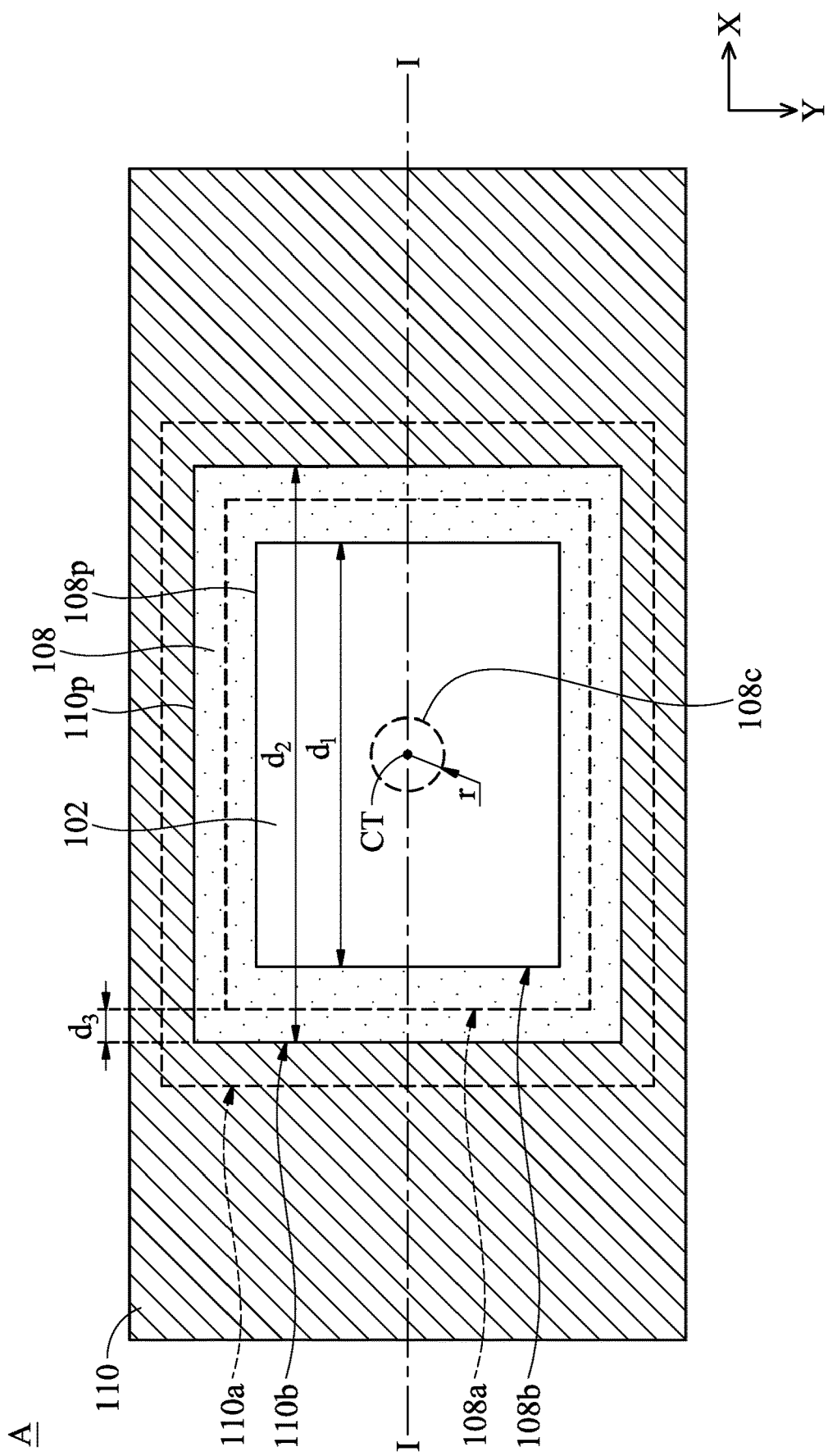
FIG. 1C is top-view diagram of region A in FIG. 1A in accordance with some embodiments of the present disclosure.

In some embodiments, the first opening 108p may include a central portion 108c. The central portion 108c may refer to the region from which the geometric center CT of the first opening 108p (e.g., as shown in FIG. 1C) extends for a certain distance. In other words, the central portion 108c may be a circular area having a certain radius that is around the geometric center CT of the first opening 108p. The definition of the central portion 108c in accordance with various embodiments will be described later in FIG. 3A.

In addition, the organic insulating layer 112 may have a fifth thickness $T_5$ at the central portion 108c of the first opening 108p. In some examples, the fifth thickness $T_5$ may be the minimum thickness at the central portion 108c of the first opening 108p. In some embodiment, the second thickness $T_2$ of the organic insulating layer 112 at the first bottom edge 108b may be greater than the fifth thickness $T_5$ of the organic insulating layer 112 at the central portion 108c. In some embodiments, the ratio of the fifth thickness $T_5$ of the organic insulating layer 112 to the second thickness $T_2$ of the organic insulating layer 112 may be greater than zero and less than or equal to 0.3, such as 0.25, 0.2, 0.15, or 0.10.

Moreover, as shown in FIG. 1B, the thickness of the organic insulating layer 112 that is within the first opening 108p may decrease gradually toward the central portion 108c. As described above, the organic insulating layer 112 having a thinner thickness (e.g., the fifth thickness $T_5$) at the central portion 108c may reduce the dielectric loss resulting from the organic insulating layer 112 (i.e. the amount of organic insulating layer 112 that the electromagnetic wave needs to pass through).

Furthermore, in some embodiments, the second thickness $T_2$ of the organic insulating layer 112 at the first bottom edge 108b may be greater than the first thickness $T_1$ of the organic insulating layer 112 at the first top edge 108a. In some embodiments, the ratio of the first thickness $T_1$ of the organic insulating layer 112 to the second thickness $T_2$ of the organic insulating layer 112 may be greater than zero and less than or equal to 0.3, such as 0.25, 0.2, 0.15, or 0.10. The second thickness $T_2$ at the first bottom edge 108b may be thinner than the first thickness $T_1$ at the first top edge 108a and thereby the intensity of the electric field consumed at the second top edge 110a may be reduced.

In addition, the first opening 108p may have a first width $d_1$ and the second opening 110p may have a second width $d_2$. In some embodiments, the second width $d_2$ may be greater than the first width $d_1$. In accordance with some embodiments, the width of the opening may be the distance between two points on the bottom edges (e.g., first bottom edge 108b) in a cross-sectional view. In addition, the width of the opening may be the maximum distance of the first opening 108p or the second opening 110p on the plane that is substantially perpendicular to the normal direction of the first substrate 102, e.g., the X-Y plane, as shown in FIG. 1C.

In some embodiments, a distance $d_3$ between the second bottom edge 110b and the first top edge 108a may be in a range from 0 μm to 50 μm (0 μm≤$d_3$≤50 μm), such as from 1 μm to 10 μm (1 μm≤$d_3$≤10 μm), or from 1 μm to 5 μm (1 μm≤$d_3$≤5 μm). It should be understood that if the distance $d_3$ between the second bottom edge 110b and the first top edge 108a is less than 0 μm, the expansion coefficients of the first substrate 102 and the first electrode 110 may not be matched. On the other hand, if the distance $d_3$ between the second bottom edge 110b and the first top edge 108a is too large, the dielectric loss resulting from the buffer layer 108 may be increased.

Next, refer to FIG. 1C, which is top-view diagram of region A in FIG. 1A in accordance with some embodiments of the present disclosure. Moreover, the cross-sectional diagram of the electronic modulating device 10 shown in FIG. 1B is the diagram obtained along line segment I-I' shown in FIG. 1C. It should be noted that the organic insulating layer 112 is omitted in FIG. 1C for clarity.

As shown in FIG. 1C, in some embodiments, the region of the first opening 108p may be defined by the first bottom edge 108b. The region of the second opening 110p may be defined by the second bottom edge 110b. But the present disclosure is not limited thereto. In some embodiments, the region of the second opening 110p may be greater than the region of the first opening 108p in the top-view perspective. In addition, in some embodiments, a radius r of the central portion 108c may be greater than zero and less than or equal to 50 μm, such as less than or equal to 30 μm, 20 μm, or 10 μm.

Figure 2A:
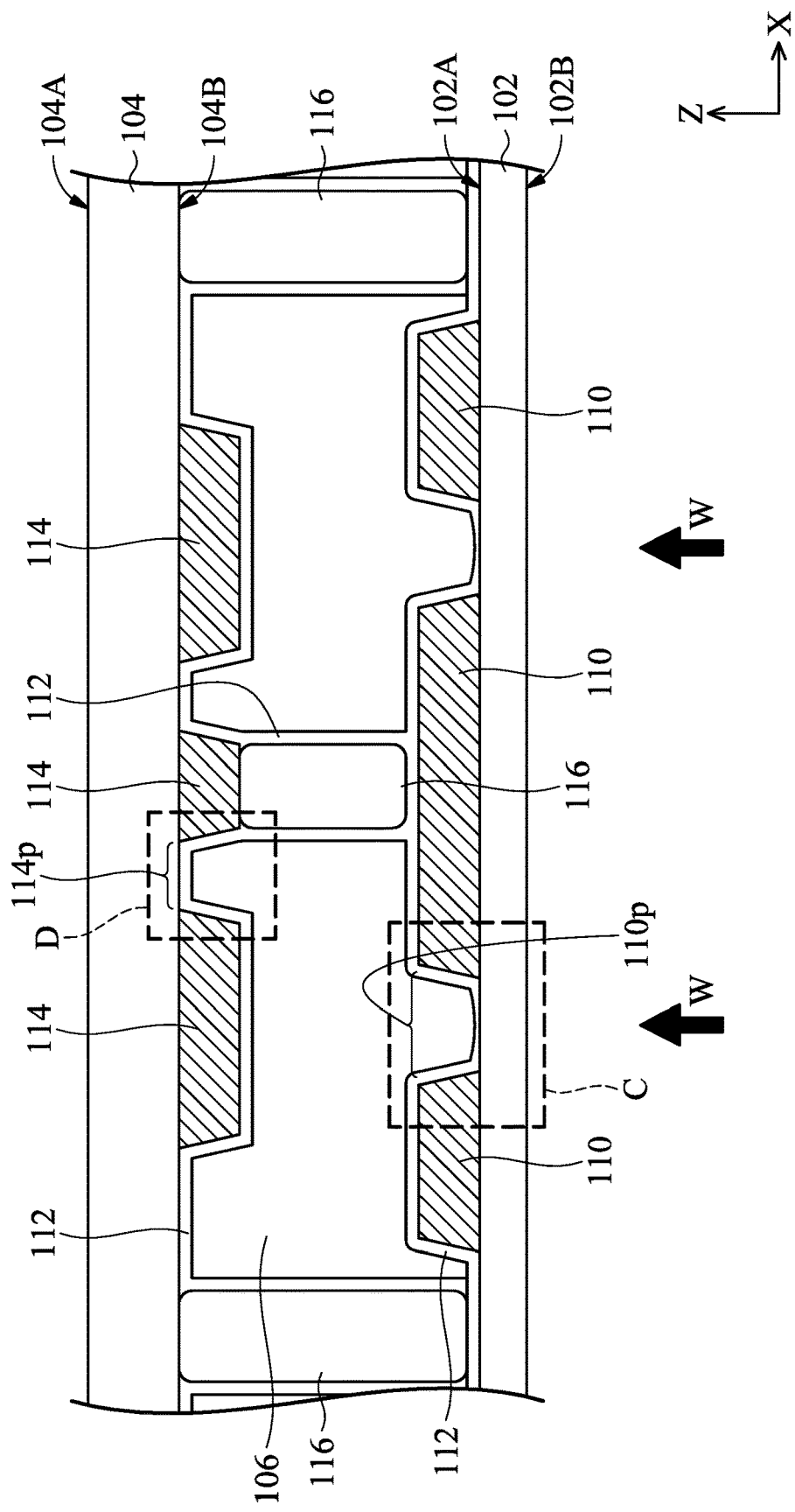
FIG. 2A is a cross-sectional diagram of an electronic modulating device in accordance with some embodiments of the present disclosure.

Next, refer to FIG. 2A, which is a cross-sectional diagram of an electronic modulating device 20 in accordance with some other embodiments of the present disclosure. It should be understood that the same or similar components or elements in the context of the descriptions provided above and below are represented by the same or similar reference numerals. The materials, manufacturing methods and functions of these components or elements are the same as or similar to those described above, and thus will not be repeated herein.

The electronic modulating device 20 is similar to the electronic modulating device 10 shown in FIG. 1A. The difference between them is that the electronic modulating device 20 may not include the buffer layer 108 with an opening 108p. As shown in FIG. 2A, the electronic modulating device 20 may include the first electrode 110 disposed on the first substrate 102. In some embodiments, the first electrode 110 may be in contact with the first substrate 102. In some embodiments, the first substrate 102 may have a multilayered structure. For example, the first substrate 102 may include a buffer layer (not illustrated). The buffer layer may be in contact with the first electrode 110 in accordance with some embodiments. The buffer layer may be patterned or non-patterned. In other examples, the first substrate 102 may include a buffer layer not in contact with the first electrode 110. More specifically, the first substrate 102 may include a buffer layer that is not patterned in accordance embodiments.

The first electrode 110 may include the second opening 110p. The second opening 110p may define the second top edge 110a and the second bottom edge 110b of the first electrode 110 (as shown in FIG. 2B). In some embodiments, the second electrode 114 may overlap the second opening 110p.

Moreover, the electronic modulating device 20 may include the organic insulating layer 112 disposed on the first electrode 110 and within the second opening 110p. In some embodiments, the organic insulating layer 112 may cover and be in contact with the first electrode 110. In particular, the organic insulating layer 112 may have different thickness within the second opening 110p to decrease the dielectric loss of the electromagnetic wave or diffusion of the metal ions into the modulating material.

In addition, the second electrode 114 may include the opening 114p in accordance with some embodiments. It should be understood that the opening 114p (region D as illustrated in figure) may have similar configuration (e.g., the thickness of organic insulating layer 112) as the region C in accordance with some embodiments.

Referring to FIG. 2B, which is an enlarged diagram of region C in FIG. 2A in accordance with some embodiments of the present disclosure. The organic insulating layer 112 may have the sixth thickness $T_6$ at the second top edge 110a of the first electrode 110. The organic insulating layer 112 may have the seventh thickness $T_7$ at the second bottom edge 110b of the first electrode 110.

In some embodiments, the seventh thickness $T_7$ of the organic insulating layer 112 at the second bottom edge 110b may be greater than the sixth thickness $T_6$ of the organic insulating layer 112 at the second top edge 110a. In some embodiments, the ratio of the sixth thickness $T_6$ of the organic insulating layer 112 to the seventh thickness $T_7$ of the organic insulating layer 112 may be greater than zero and less than or equal to 0.4, such as 0.35, 0.30, 0.25 or 0.2.

Furthermore, the thickness of the organic insulating layer 112 on the top surface $110S_1$ of the first electrode 110 may be uniform. In some embodiments, the organic insulating layer 112 may have a sixth thickness $T_6'$ on the top surface $110S_1$ other than the second top edge 110a. In some embodiments, the sixth thickness $T_6'$ may be greater than or less than the sixth thickness $T_6$ of the organic insulating layer 112 at the second top edge 110a.

The sixth thickness $T_6$ at the second top edge 110a may be thinner than the seventh thickness $T_7$ at the second bottom edge 110b or the sixth thickness $T_6'$ on the top surface $110S_1$, and thereby the intensity of the electric field consumed at the second top edge 110a may be reduced.

In addition, the second opening 110p may include a central portion 110c. The organic insulating layer 112 may have an eighth thickness $T_8$ at the central portion 110c of the second opening 110p. In some embodiment, the seventh thickness $T_7$ of the organic insulating layer 112 at the second bottom edge 110b may be greater than the eighth thickness $T_8$ of the organic insulating layer 112 at the central portion 110c. In some embodiments, the ratio of the eighth thickness $T_8$ of the organic insulating layer 112 to the seventh thickness $T_7$ of the organic insulating layer 112 may be greater than zero and less than or equal to 0.3, such as 0.25, 0.2, 0.15, or 0.10.

As shown in FIG. 2B, the thickness of the organic insulating layer 112 that is within the second opening 110p may decrease gradually toward the central portion 110c. As described above, the organic insulating layer 112 having a thinner thickness (e.g., the eighth thickness $T_8$) at the central portion 110c may reduce the dielectric loss of the electromagnetic wave from the organic insulating layer 112.

Next, refer to FIG. 2C, which is top-view diagram of region C in FIG. 2A in accordance with some embodiments of the present disclosure. Moreover, the cross-sectional diagram of the electronic modulating device 20 shown in FIG. 2B is the diagram obtained along line segment T-T' shown in FIG. 2C. It should be noted that the organic insulating layer 112 is omitted in FIG. 2C for clarity.

As shown in FIG. 2C, the region of the second opening 110p may be defined by the second bottom edge 110b. In some embodiments, a radius r of the central portion 110c may be greater than zero and less than or equal to 50 μm, such as less than or equal to 30 μm, 20 μm, or 10 μm.

Figure 3B:
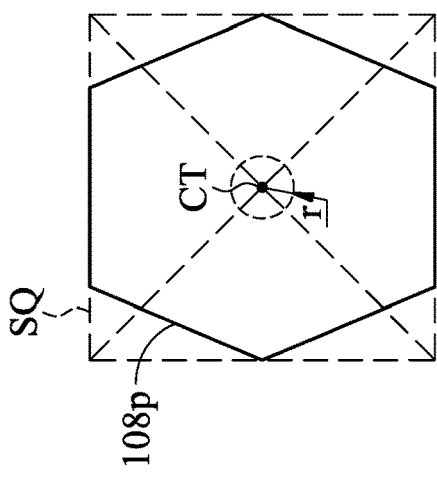
Figure 3D:
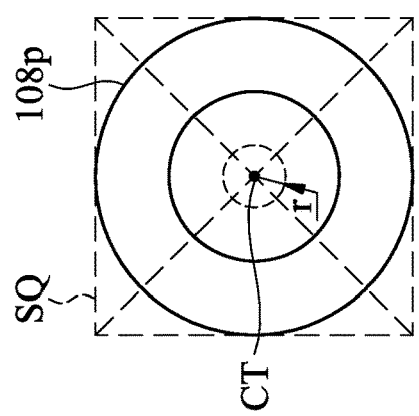
Figure 3C:
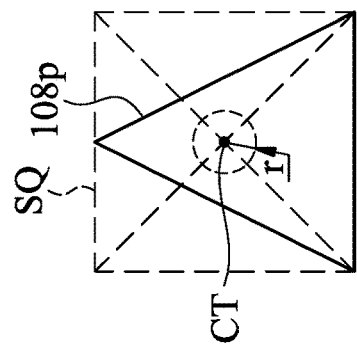
Figure 3G:
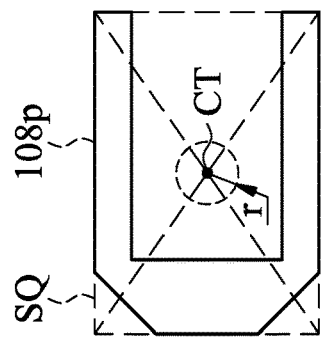
Figure 3B:
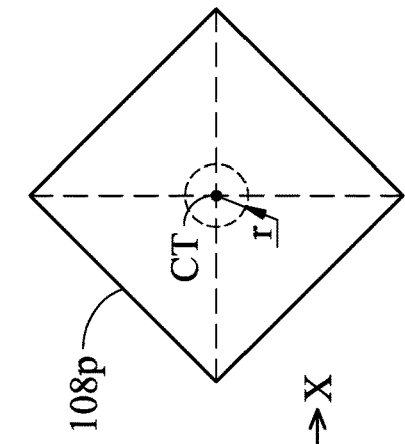
Figure 3A:
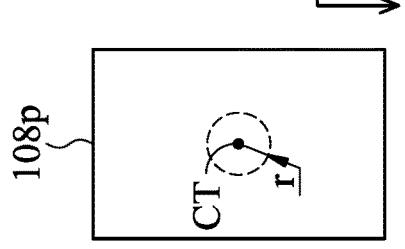
Figure 3F:
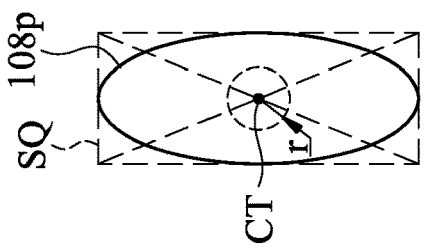
Figure 3E:
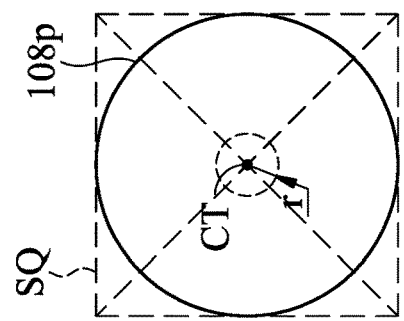

Next, refer to FIGS. 3A-3H, which are top-view diagrams of the first opening 108p of the buffer layer 108 in accordance with some embodiments of the present disclosure. As shown in FIGS. 3A-3H, the first opening 108p may be patterned to have various shapes. In some embodiments, the first opening 108p may have a rectangle shape (as shown in FIG. 3A), a square shape (as shown in FIG. 3B), a triangle shape (as shown in FIG. 3C), a pentagonal shape, a hexagonal shape (as shown in FIG. 3D), a heptagonal shape, an octagonal shape, a circular shape (as shown in FIG. 3E), an ellipse shape (as shown in FIG. 3F), an irregular shape (as shown in FIG. 3G), a donut shape (as shown in FIG. 3H), another suitable shape, but it is not limited thereto.

In addition, as shown in FIGS. 3A and 3B, the geometric center CT of the first opening 108p that has a rectangle shape or a square shape may be the intersection point of two diagonals in accordance with some embodiments. In some other embodiments, as shown in FIGS. 3C-3H, for the first opening 108p that has the shape other than rectangle or square shape, the geometric center CT of such first opening 108p may be the intersection point of two diagonals of the minimum rectangle or square that can encompass the first opening 108p.

The central portion 108c may refer to the region from which the geometric center CT of the first opening 108p extends for a certain distance (radius r). In other words, the central portion 108c may be a circular area having a radius r that is around the geometric center CT of the first opening 108p. In some embodiments, the radius r of the central portion 108c may be greater than zero and less than or equal to 50 μm, such as less than or equal to 30 μm, 20 μm, or 10 μm.

It should be noted that the second opening 110p may also have the similar configuration as that of the first opening 108p as described above in accordance with some embodiments. In addition, the geometric center CT and the central portion 110c of the second opening 110p may be defined in the same manner as described above.

Next, refer to FIGS. 4A-4G, which are cross-sectional diagrams of a portion of the electronic modulating device 10 (e.g., region E shown in FIG. 1B) in accordance with some embodiments of the present disclosure. As shown in FIGS. 4A-4G, the organic insulating layer 112 may have different profiles in accordance with various embodiments.

For example, the organic insulating layer 112 disposed within the first opening 108p or the second opening 110p may protrude toward the geometric center CT of the first opening 108p or the second opening 110p. In some embodiments, the organic insulating layer 112 may include protruding portions 112t and recessed portions 112r. In some embodiments, the protruding portion 112t may have a rounded shape, a flat shape, a curved shape, another suitable shape, or a combination thereof. In some embodiments, the organic insulating layer 112 on the first substrate 102 may have a wave shape. In addition, the slopes of the organic insulating layer 112 on the first electrode 110, the buffer layer 108 and the first substrate 102 may be different. In some embodiments, the slope of the organic insulating layer 112 may be changed along the profile of the first electrode 110, the buffer layer 108 or the first substrate 102.

Next, refer to FIGS. 5A-5F, which are cross-sectional diagrams of a portion of the electronic modulating device 10 (e.g., region E shown in FIG. 1B) in accordance with some embodiments of the present disclosure. As shown in FIGS. 5A-5F, the first electrode 110 and the buffer layer 108 may have different profiles in accordance with various embodiments.

Figure 5A:
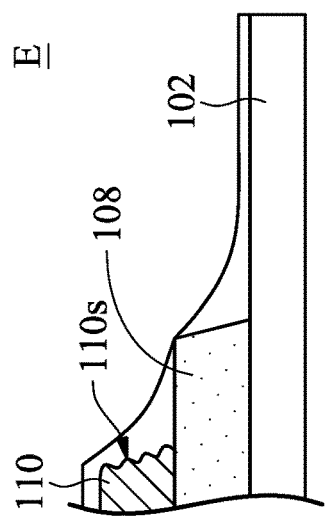
FIGS. 5A-5F are cross-sectional diagrams of a portion of the electronic modulating device in accordance with some embodiments of the present disclosure.
Figure 5B:
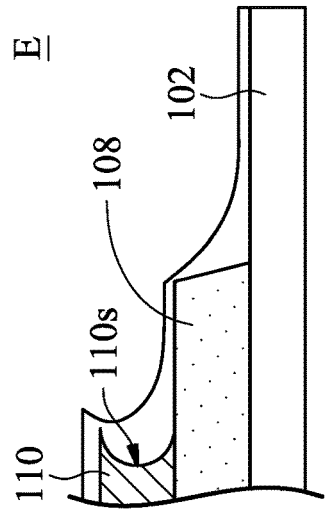
Figure 5C:
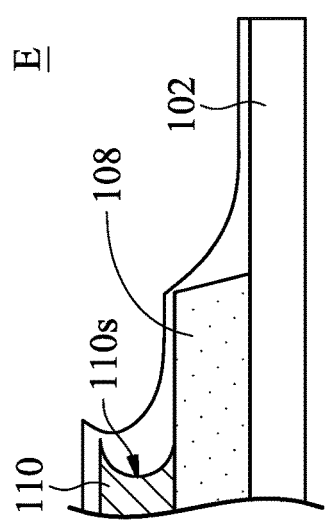

For example, as shown in FIGS. 5A-5C, an inner side 110s of the first electrode 110 may have a bent shape, a recessed shape, a wave shape, another suitable shape, or a combination thereof in accordance with some embodiments. The inner side 110s of the first electrode 110 may be the sidewall of the first electrode 110 that is adjacent to the second opening 110p.

Figure 5D:
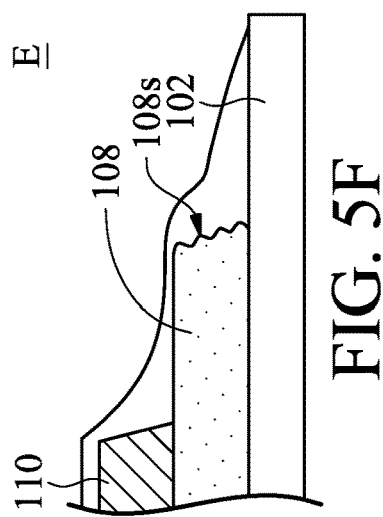
Figure 5E:
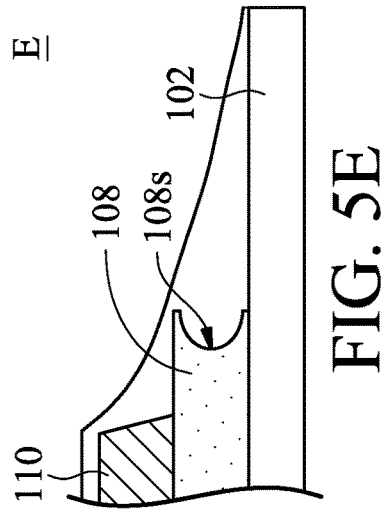
Figure 5F:
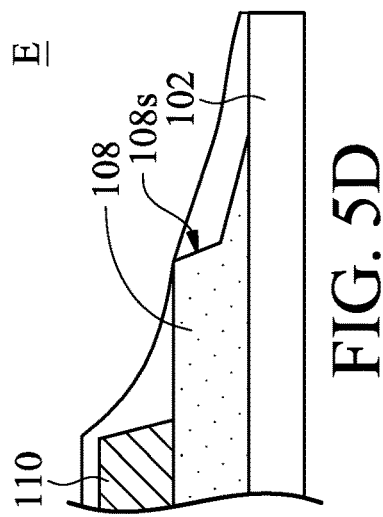

In addition, as shown in FIGS. 5D-5F, an inner side 108s of the buffer layer 108 may have a bent shape, a recessed shape, a wave shape, another suitable shape, or a combination thereof in accordance with some embodiments.

Next, refer to FIGS. 6A-6F, which are enlarged diagrams of region A in FIG. 1A during a method for manufacturing the electronic modulating device 10 in accordance with some embodiments of the present disclosure. It should be understood that, additional operations may be provided before, during, or after the processes in the method for manufacturing the electronic modulating device 10. In some embodiments, some of the operations described below may be replaced or eliminated. In some embodiments, the order of the operations may be interchangeable.

Referring to FIG. 6A, the first substrate 102 is provided. The buffer layer 108 and the first electrode 110 may be sequentially formed on the first substrate 102. The first electrode 110 may be patterned to form the second opening 110p. The second opening 110p may expose a portion of the top surface $108S_1$ of the buffer layer 108.

In some embodiments, the buffer layer 108 may be formed by using a chemical vapor deposition (CVD) process, a spin coating process, a printing process, or a combination thereof. The chemical vapor deposition process may include, but is not limited to, a low-pressure chemical vapor deposition (LPCVD) process, a low-temperature chemical vapor deposition (LTCVD) process, a rapid thermal chemical vapor deposition (RTCVD) process, a plasma enhanced chemical vapor deposition (PECVD) process, or an atomic layer deposition (ALD) process.

In some embodiments, the first electrode 110 may be formed by using a chemical vapor deposition process, a physical vapor deposition process, an electroplating process, an electroless plating process, another suitable process, or a combination thereof. The physical vapor deposition process may include, but is not limited to, a sputtering process, an evaporation process, or a pulsed laser deposition. In addition, in some embodiments, the second opening 110p may be formed by one or more photolithography processes and etching process. In some embodiments, the photolithography process may include photoresist coating (e.g., spin coating), soft baking, hard baking, mask aligning, exposure, post-exposure baking, developing the photoresist, rinsing, drying, or another suitable process. In some embodiments, the etching process may include a dry etching process or a wet etching process.

Next, referring to FIG. 6B, the buffer layer 108 may be patterned to form the first opening 108p. The first opening 108p may expose a portion of the top surface 102A of the first substrate 102. In addition, the first opening 108p may be formed by one or more photolithography processes and etching process as described above.

Next, referring to FIG. 6C, the organic insulating layer 112 may be formed on the first electrode 110 and within the first opening 108p and the second opening 110p. In some embodiments, the organic insulating layer 112 may be formed on the first electrode 110, the buffer layer 108 and the first substrate 102.

In some embodiments, the organic insulating layer 112 may be formed by using a chemical vapor deposition process, a spin coating process, a printing process, or a combination thereof.

Next, referring to FIG. 6D and FIG. 6E, the organic insulating layer 112 may be patterned to have a desired profile by a photolithography process. As described above, the photolithography process may include photoresist coating (e.g., spin coating), soft baking, hard baking, mask aligning, exposure, post-exposure baking, developing the photoresist, rinsing, drying, or another suitable process. Specifically, a photoresist layer 204 may be formed on the organic insulating layer 112, and a mask 202 may be used in the photolithography process in accordance with some embodiments. In some embodiments, the mask 202 may include a halftone mask that may offer multiple transmission levels.

As shown in FIG. 6E, a portion of the photoresist layer 204 may be removed to form a remained photoresist layer 204' during the photolithography process. The remained photoresist layer 204' may be disposed within a portion of the first opening 108$p$ and/or the second opening 110$p$. Next, as shown in FIG. 6F, a portion of the organic insulating layer 112 and/or the remained photoresist layer 204' may be removed to form the organic insulating layer 112 with the desired profile (e.g., having different thickness within the first opening 108$p$ and the second opening 110$p$). In some embodiments, the remained photoresist layer 204' may be removed by an ashing process or an etching process.

Next, refer to FIGS. 7A-7F, which are enlarged diagrams of region A in FIG. 1A during a method for manufacturing the electronic modulating device 10 in accordance with some other embodiments of the present disclosure. The processes shown in FIG. 7A-7F are similar to those shown in FIG. 6A-6F. The difference between them is that, as shown in FIG. 7D, the mask 202' used in the photolithography process may include a full tone mask that may offer a single transmission level. As shown in FIG. 7E, in this embodiment, the remained photoresist layer 204' may be disposed on the top surface 110$S_1$ of the first electrode 110. In some embodiments, the remained photoresist layer 204' may not be disposed within the first opening 108$p$ and/or the second opening 110$p$ depending on the desired profile of the organic insulating layer 112.

Next, refer to FIGS. 8A-8D, which are enlarged diagrams of region C in FIG. 2A during a method for manufacturing the electronic modulating device 20 in accordance with some embodiments of the present disclosure. It should be understood that, additional operations may be provided before, during, and after the processes in the method for manufacturing the electronic modulating device 20. In some embodiments, some of the operations described below may be replaced or eliminated. In some embodiments, the order of the operations may be interchangeable.

Figure 8A:
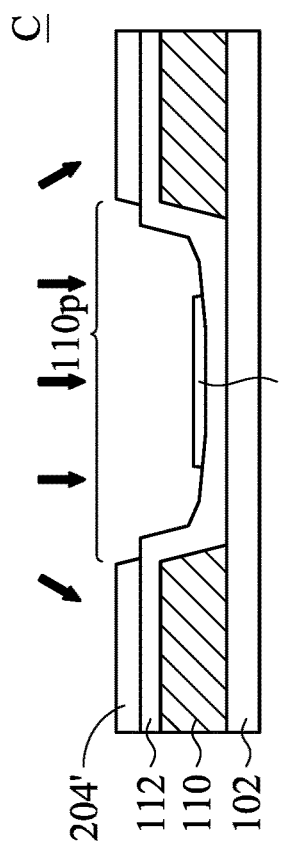
FIGS. 8A-8D are enlarged diagrams of region C in FIG. 2A during the manufacturing processes in accordance with some embodiments of the present disclosure.

Referring to FIG. 8A, the first substrate 102 is provided. The first electrode 110 may be sequentially formed on the first substrate 102. The first electrode 110 may be patterned to form the second opening 110$p$. The second opening 110$p$ may expose a portion of the top surface 102A of the first substrate 102. Thereafter, the organic insulating layer 112 may be formed on the first electrode 110 and within the second opening 110$p$. In some embodiments, the organic insulating layer 112 may conformally formed on the first electrode 110 and the first substrate 102.

The processes for forming the first electrode 110 and the organic insulating layer 112 may be similar to those described above, and thus are not repeated herein.

Figure 8B:
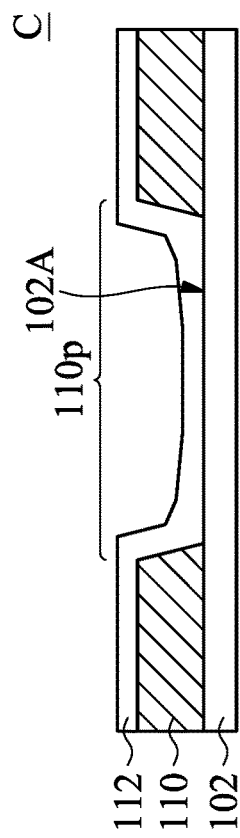
Figure 8C:
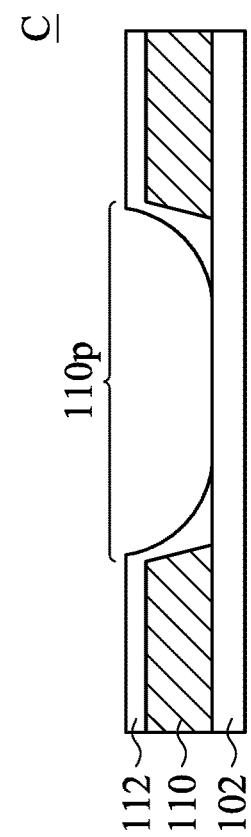

Next, referring to FIG. 8B and FIG. 8C, the organic insulating layer 112 may be patterned to have a desired profile by a photolithography process. Specifically, a photoresist layer 204 may be formed on the organic insulating layer 112, and a mask 202 may be used in the photolithography process in accordance with some embodiments. In some embodiments, the mask 202 may include a halftone mask that may offer multiple transmission levels.

Figure 8D:
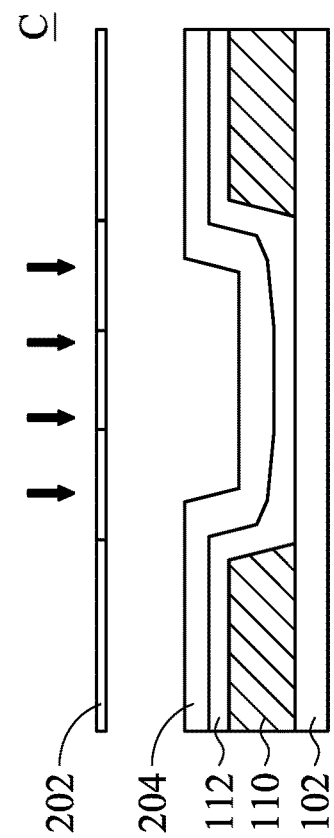

As shown in FIG. 8C, a portion of the photoresist layer 204 may be removed to form a remained photoresist layer 204' during the photolithography process. The remained photoresist layer 204' may be disposed within a portion of the second opening 110$p$. Next, as shown in FIG. 8D, a portion of the organic insulating layer 112 and/or the remained photoresist layer 204' may be removed to form the organic insulating layer 112 with the desired profile (e.g., having different thickness within the second opening 110$p$). In some embodiments, the remained photoresist layer 204' may be removed by an ashing process or an etching process.

Figure 9A:
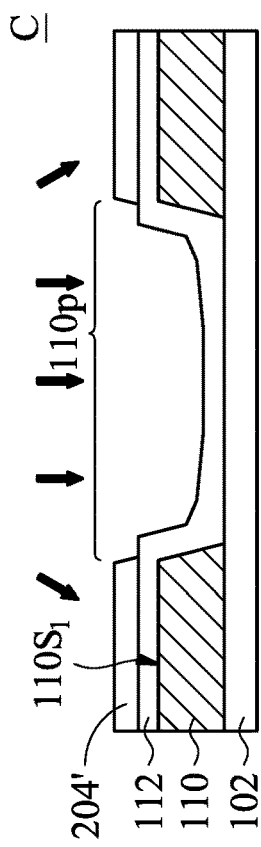
FIGS. 9A-9D are enlarged diagrams of region C in FIG. 2A during the manufacturing processes in accordance with some embodiments of the present disclosure.
Figure 9B:
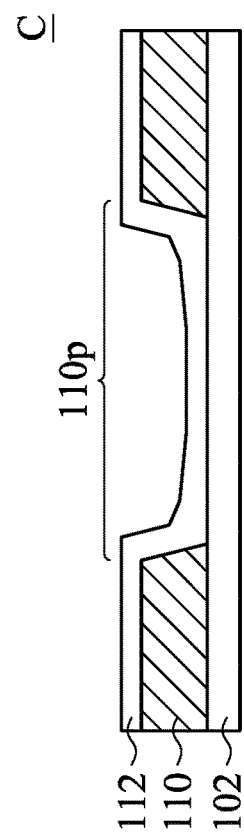
Figure 9C:
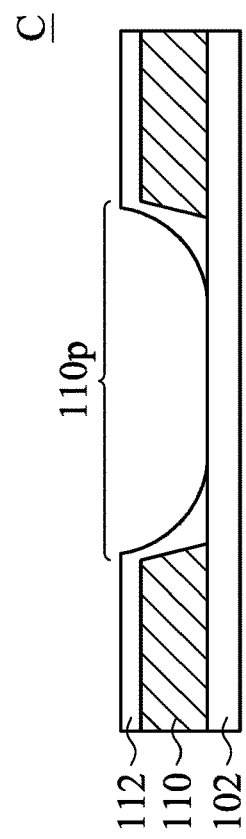
Figure 9D:
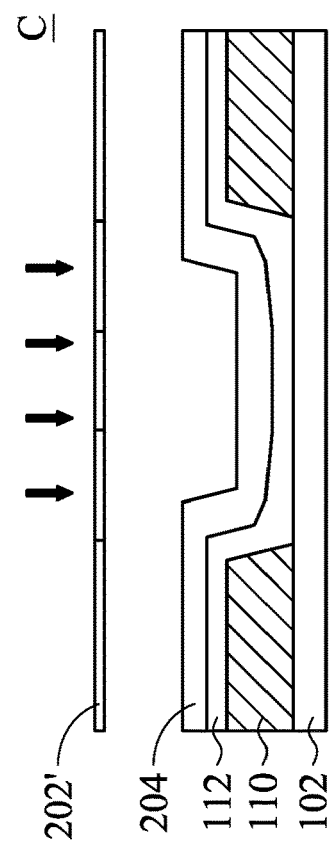

Next, refer to FIGS. 9A-9D, which are enlarged diagrams of region C in FIG. 2A during a method for manufacturing the electronic modulating device 20 in accordance with some other embodiments of the present disclosure. The processes shown in FIG. 9A-9D are similar to those shown in FIG. 8A-8D. The difference between them is that, as shown in FIG. 9B, the mask 202' used in the photolithography process may include a full tone mask that may offer a single transmission level. As shown in FIG. 9C, in this embodiment, the remained photoresist layer 204' may be disposed on the top surface 110$S_1$ of the first electrode 110. In this embodiment, the remained photoresist layer 204' may not be disposed within the second opening 110$p$.

To summarize the above, in accordance with some embodiments of the present disclosure, an electronic modulating device is provided. The electronic modulating device may include an organic insulating layer having different thickness within the opening defined by the buffer layer or the electrode. The thickness of the organic insulating layer may be controlled to decrease the dielectric loss of the electromagnetic wave or to prevent metal ions of the electrode from diffusing into the modulating material.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic modulating device, comprising:
a first substrate;
a second substrate disposed opposing to the first substrate;
a modulating material disposed between the first substrate and the second substrate;
a buffer layer disposed on the first substrate, and the buffer layer comprising a first opening defining a first top edge and a first bottom edge of the buffer layer;
a first electrode disposed on the buffer layer, and the first electrode comprising a second opening defining a second top edge and a second bottom edge of the first electrode; and
an organic insulating layer disposed on the first electrode and within the first opening and the second opening;
wherein a thickness of the organic insulating layer at the second bottom edge is greater than a thickness of the organic insulating layer at the first top edge, wherein a distance between the second bottom edge and the first top edge is in a range from 1 µm to 50 µm.

2. The electronic modulating device as claimed in claim 1, wherein the thickness of the organic insulating layer at the second bottom edge is greater than a thickness of the organic insulating layer at the second top edge.

3. The electronic modulating device as claimed in claim 2, wherein a ratio of the thickness of the organic insulating layer at the second top edge to the thickness of the organic insulating layer at the second bottom edge is greater than zero and less than or equal to 0.4.

4. The electronic modulating device as claimed in claim 1, wherein the first opening comprises a central portion, and wherein a thickness of the organic insulating layer at the first bottom edge is greater than a thickness of the organic insulating layer at the central portion.

5. The electronic modulating device as claimed in claim 4, wherein a thickness of the organic insulating layer within the first opening decreases gradually toward the central portion.

6. The electronic modulating device as claimed in claim 4, wherein a ratio of the thickness of the organic insulating layer at the central portion to the thickness of the organic insulating layer at the first bottom edge is greater than zero and less than or equal to 0.3.

7. The electronic modulating device as claimed in claim 1, wherein a thickness of the organic insulating layer at the first bottom edge is greater than the thickness of the organic insulating layer at the first top edge.

8. The electronic modulating device as claimed in claim 7, wherein a ratio of the thickness of the organic insulating layer at the first top edge to the thickness of the organic insulating layer at the first bottom edge is greater than zero and less than or equal to 0.3.

9. The electronic modulating device as claimed in claim 1, wherein a width of the second opening is greater than a width of the first opening.

10. The electronic modulating device as claimed in claim 1, further comprising a second electrode disposed between the modulating material and the second substrate, wherein the second electrode overlaps the first opening and the second opening.

11. The electronic modulating device as claimed in claim 1, wherein a ratio of the thickness of the organic insulating layer at the first top edge to the thickness of the organic insulating layer at the second bottom edge is greater than zero and less than or equal to 0.4.

* * * * *